June 16, 1964  H. H. WIEDER  3,137,587
METHOD AND APPARATUS FOR THE MANUFACTURE OF
SEMICONDUCTOR FILM-TYPE HALL GENERATORS
Filed Nov. 7, 1961  2 Sheets-Sheet 1

HARRY H. WIEDER
INVENTOR.

BY
*J. M. St. Amand*
ATTORNEY

June 16, 1964 H. H. WIEDER 3,137,587
METHOD AND APPARATUS FOR THE MANUFACTURE OF
SEMICONDUCTOR FILM-TYPE HALL GENERATORS
Filed Nov. 7, 1961 2 Sheets-Sheet 2

HARRY H. WIEDER
INVENTOR.

BY

ATTORNEY

United States Patent Office 3,137,587
Patented June 16, 1964

3,137,587
METHOD AND APPARATUS FOR THE MANUFACTURE OF SEMICONDUCTOR FILM-TYPE HALL GENERATORS
Harry H. Wieder, Riverside, Calif., assignor to the United States of America as represented by the Secretary of the Navy
Filed Nov. 7, 1961, Ser. No. 150,846
5 Claims. (Cl. 117—4)
(Granted under Title 35, U.S. Code (1952), sec. 266)

The invention herein described may be manufactured and used by or for the Government of the United States of America for governmental purposes without the payment of any royalties thereon or therefor.

The present invention relates to semiconducting films and more particularly to an improved method of producing thin semi-conducting films and for use of such films.

Two main methods are presently known for producing thin films of indium antimonide, InSb: One, by evaporating stoichiometric quantities of InSb in a vacuum upon a heated glass substrate, as described by K. G. Gunther, Zeitsch Naturforsch. 13a, 1081 (1958), and a variant of this method is used to produce excellent films of InSb varying in thickness between $0.5\mu$ and $10\mu$; the other, by suddenly squashing a drop of molten InSb between two optical flats and then allowing them to cool, thus producing self-supporting films of the order of $10\mu$ thickness, according to Bate and Taylor, Journal of Applied Physics 31, 991 (1960).

A major disadvantage of the aforementioned evaporation procedure is the granular nature of the deposit which produces barrier resistances between the semiconductor grains much larger than the effective resistance of the semiconductor grains. Furthermore, the glass substrate is not an efficient thermal conductor, hence heat will be accumulated in the semiconductor film due to Joule heating when a drive current is passed through the film.

The major disadvantage of the squash method is that unless care is taken during the cooling of the film, the differential thermal expansion between the InSb film and the substrate will lead to cracking of the film and/or large stresses between the substrate and the film. If glass is used as the substrate, then the problem of Joule heating also occurs.

The present invention overcomes the foregoing disadvantages in forming a semiconductor film on a ferrite substrate by means hereinafter described. The films produced by the present invention have the following advantages: The excellent adherence between the InSb film and the ferrite substrate yields a very good coefficient of heat transfer, better by a factor of four or more over that of the evaporated film upon glass. The high permeability of the ferrite multiples the effective field seen by the film by a factor between 2 and 100, as discussed by H. Hieronymus and H. Weiss, Siemens Zeitsch., 31, 404 (1957). Slow, controlled cooling prevents formation of cracks within the film over a region sufficiently large to permit subsequent fabrication of a Hall plate. Films as thin as $10^{-4}$ cm. can be produced easily by this method. Semiconductor film-type Hall generators fabricated as described herein can be used as disclosed in copending application Serial No. 303,462, filed July 31, 1963, for Electrical Pulse Delay and Regenerator Circuit.

It is an object of the present invention, therefore, to provide a method for producing a semiconductor film upon a ferrite substrate.

Another object of the invention is to provide a method for fabricating a Hall plate on a ferrite slab by hot pressing.

Other objects and many of the attendant advantages of this invention will become readily appreciated as the same becomes better understood by reference to the following detailed description when considered in connection with the accompanying drawings wherein.

Figure 1:
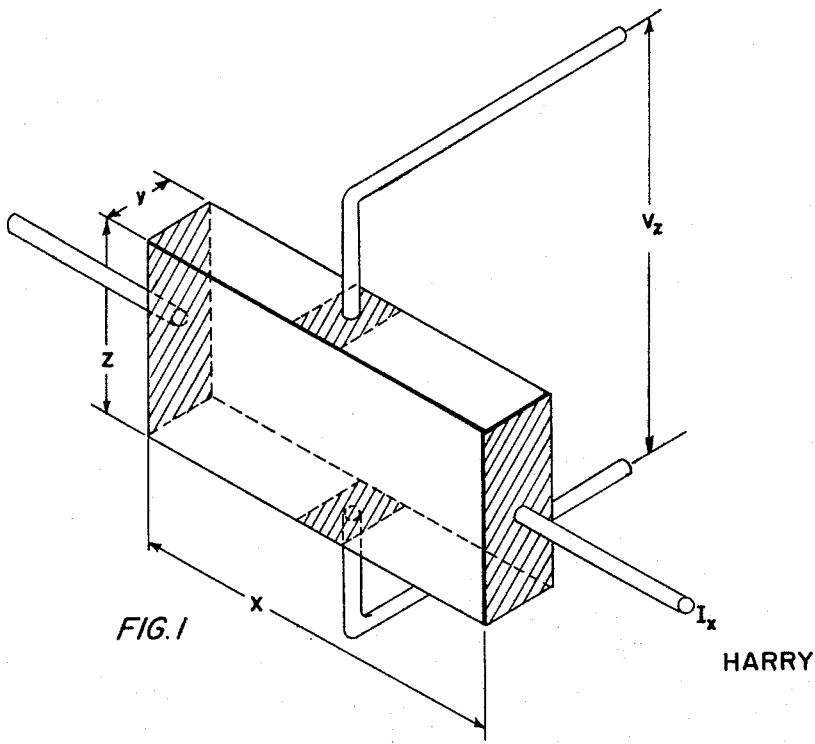
FIGURE 1 is a diagrammatic sketch of a semiconductor slab showing drive current electrodes and Hall potential electrodes.

The Hall effect is a phenomenon due to the deflections of moving charge carriers by a magnetic field at right angles to their direction of motion. If a drive current $I_x$ is applied to a rectangular semiconductor slab, oriented as shown in FIGURE 1, and a magnetic induction $B_y$ is orthogonal with the drive current, then at equilibrium, a field $E_z$ will arise between the excess free charge at the negaitve $z$ surface and the fixed donors or acceptors at the positive $z$ surface. The potenial difference between these surfaces is the Hall voltage $V_z$ and is defined by the equation:

$$V_z = R_h \left(\frac{\bar{I}_x \cdot \bar{B}_y}{y}\right) \times 10^{-8} \text{ volts} \qquad (1)$$

The Hall coefficient $R_h$ is a material parameter. It is proportional to the product of the mobility of the charge carriers within a particular material and the specific resistivity of that material. The n-type intermetallics have the highest mobility of any known semiconductors. It is of the order of 65,000 cm.$^2$ (volt-sec.) for single crystals of indium antimonide. The sensitivity of a Hall device may be defined as the Hall potential per unit magnetic field. It is readily seen from Equation 1 that the highest sensitivity is inversely proportional to the thickness $y$, shown in FIGURE 1, of the semiconductor slab. Consequently, in order to obtain highly sensitive Hall devices, it is desirable that they be fabricated from thin films of indium antimonide.

The method of fabrication of a highly sensitive InSb film type Hall generator will now be described in detail.

A high permeability ferrite (such as MN–30 manufactured by the Kearfoot Corporation) is sliced by means of an ultrasonic cutting tool, into a slab 0.1 cm. thick and having a rectangular surface area 1 cm. square, for example. It is then ground and polished to be optically flat. A grain of $\frac{1}{20}$ gram of n-type InSb having a charge carrier density of $10^{17}$ electrons/cm.$^3$ is placed on the ferrite slab. It is very important that both the ferrite as well as the semiconductor boule be scrupulously clean. For this purpose they must be vapor cleaned in carbon tetrachloride, washed with deionized water and dried in a vacuum.

Figure 2:
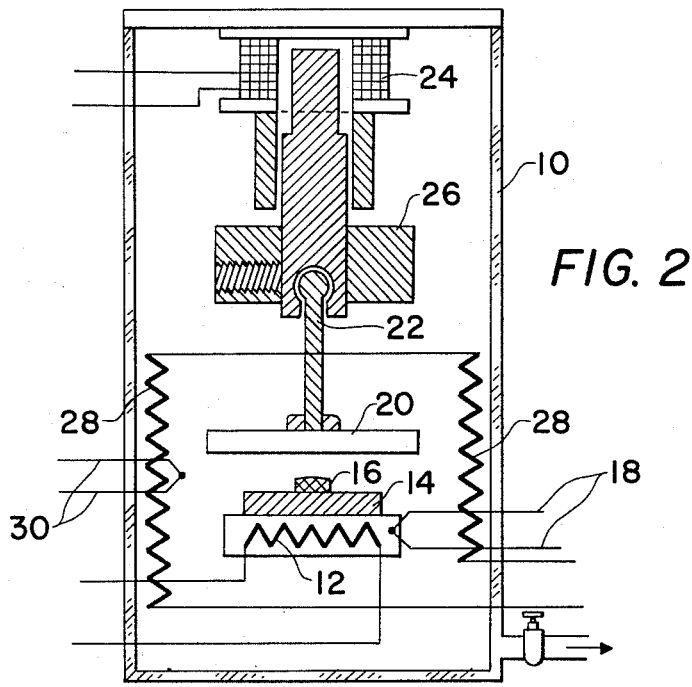
FIGURE 2 shows a diagrammatic sketch of apparatus for fabricating semiconductor films on ferrite substrates by hot pressing.

The ferrite and the semiconductor boule are then placed in the apparatus shown in FIGURE 2. A cylindrical glass enclosure 10 containing an atmosphere of helium holds the substrate heater 12 upon which rests the ferrite plate 14, and the indium antimonide boule. Thermocouple 18 serves to monitor the temperature of the substrate heater block 12. A quartz plate 20 is attached by means of a ball joint connector rod 22 to a solenoid actuator 24 which also has a counter weight 25 affixed to its arm. A space heater 28 serves to maintain a controlled ambient temperature on the film.

The substrate temperature is raised to 550° C. as monitored by the thermocouple. This liquifies the semiconductor boule. At thermal equilibrium the solenoid actuator 24 is tripped dropping or lowering the quartz plate 20 upon the drop of InSb 16 which is squashed into a flat film whose thickness depends upon the weight 26. Throughout this process the space heater 28 is maintained at a temperature of approximately 250° C. After the film is squashed, the substrate heater 12 is shut off. When thermocouple 18 reaches the same temperature as thermocouple 30, such that the film will not stick to the quartz, the solenoid actuator 24 is again energized and the quartz plate 20 lifted. By means of heater 28 the space temperature is now dropped approximately 1° C./hour until room temperature is reached.

Films produced in this manner have the following advantages: The excellent adherence between the InSb film and the ferrite substrate yields a very good coefficient of heat transfer better by a factor of four or more over that of the evaporated film upon glass. The high permeability of the ferrite multiplies the effective field seen by the film by about a factor of two. Slow, controlled cooling prevents formation of cracks within the film over a region sufficiently large (about 1 cm. x 0.5 cm.) to permit subsequent fabrication of the Hall plate. Films as thin as $10^{-4}$ cm. can be produced easily by this method.

Figure 3:
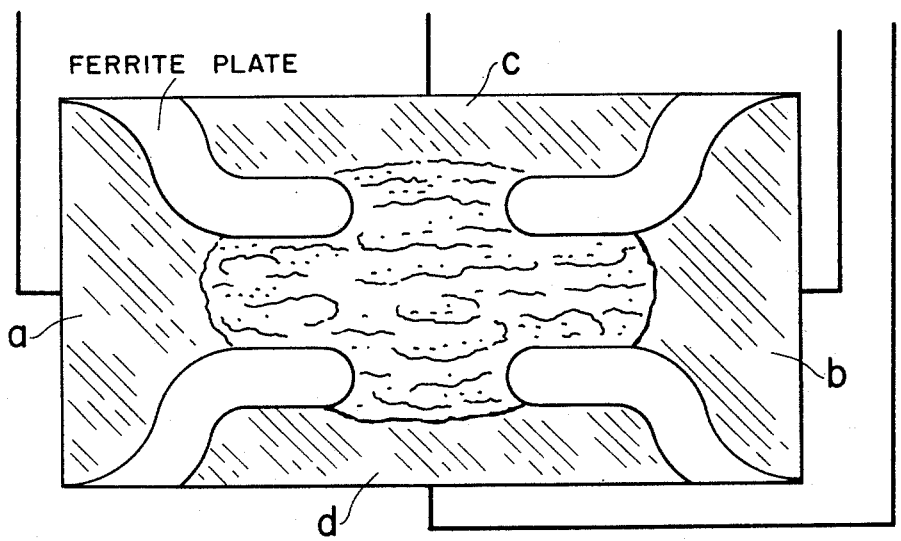
FIGURE 3 shows a Hall plate cut in a particular pattern from a semiconductor slab.

Preparation of the Hall plate proper is now continued by cutting the particular pattern shown in FIGURE 3 by means of an ultrasonic cutting tool. As shown, the length to width ratio is of the order of 3:1 in accordance with theoretical and experimental studies of I. Isenberg et al., Review of Scientific Instruments 19, 685 (1948). This ratio reduces dimensional effects in considering the Hall effect; however, some other configuration might be used to advantage for other applications. In FIGURE 3, terminals $a$ and $b$ are the drive current electrodes and terminals $c$ and $d$ are the Hall voltage electrodes. They are shown with electrode wires affixed with conductive cement although if desired, the film is sufficiently sturdy that it can be soldered to with a low temperature solder such as indium-tin alloys.

Regardless of what method of preparation is employed for fabricating the InSb films, the increased resistance of the film limits the amount of drive current that may be passed through the film without causing Joule heating, the consequent rise in temperature bringing about a decrease in the Hall coefficient $R_h$ because of the decreased mobility of the charge carriers as well as other factors. Yet as may readily be seen from Equation 1, the Hall voltage per unit magnetic field is directly proportional to the drive current $I_x$ hence for maximum sensitivity a large drive current is desirable.

Figure 4:
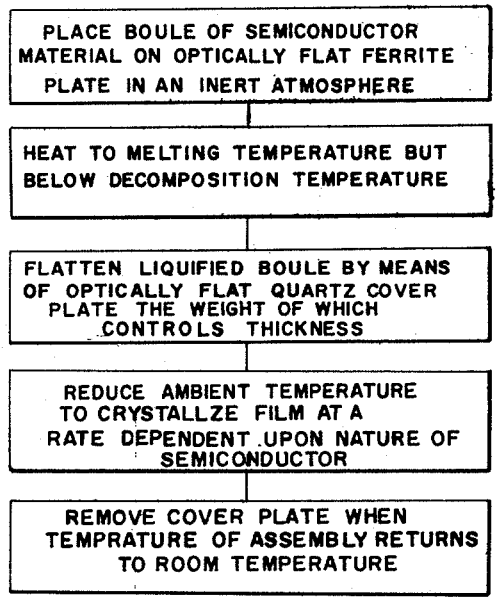
FIG. 4 is a flow chart showing the basic steps involved in fabricating film-type semiconductor plates for use as Hall generators according to the present invention.

The present invention teaches a simple method for fabricating a highly sensitive InSb or other intermetallic semiconductor Hall voltage generator. FIG. 4 shows in flow chart form a summation of the basic steps in fabricating the semiconductor film-type Hall plates described above.

While the method for fabricating thin films by hot pressing has been already discussed herein, the employment of centrifugal rotation of the substrate during hot pressing of the film should improve the homogeneity of the film.

The shape of the Hall plate need not be the rectangular structure disclosed for any shape needed to fit the particular application desired may be used to advantage with the pulse method of operation or may be fabricated after hot pressing by an ultrasonic tool.

For directional effects, the ferrite substrate may have additional ferrite plates added to the construction in order to increase the field multiplying effect and decrease the demagnetizing factor of a Hall detector assembly.

The use of pulsed operation for Hall effect devices encompasses the range of application of Hall generators covered by W. J. Grubbs, Bell System Technical Journal 38, 853 (1959). When the Hall plate is used for the detection of small magnetic fields, assuming a minimum detectible Hall voltage pulse of $10\mu$ volts, the minimum magnetic field that can be detected in this fashion is seen to be of the order of $10^{-2}$ to $10^{-3}$ gauss or better.

Obviously many modifications and variations of the present invention are possible in the light of the above teachings. It is therefore to be understood that within the scope of the appended claims the invention may be practiced otherwise than as specifically described.

What is claimed is:

1. The fabrication of semiconductor films for Hall effect generators comprising:
    (a) cutting a slab of high permeability ferrite and grinding and polishing a surface area of said ferrite slab into an optically flat plate, and scrupulously cleaning said surface,
    (b) placing a scrupulously cleaned grain of semiconductor material on the optically flat surface of said ferrite slab,
    (c) placing said ferrite slab with grain of semiconductor material thereon within an enclosure having an inert atmosphere,
    (d) raising the temperature of said ferrite slab sufficiently to liquify said grain of semiconductor, and maintaining within said enclosure an ambient temperature at approximately half measured in centigrade that required to liquify said grain of semiconductor,
    (e) squashing said liquified grain of semiconductor into a flat film on said flat ferrite surface by dropping a quartz plate thereon, controlling the thickness of said film by the weight of the quartz plate,
    (f) lifting the quartz plate from said semiconductor film and ferrite slab when the temperature of said slab drops to the ambient temperature within the enclosure,
    (g) cooling the enclosure containing the ferrite slab with the semiconductor film formed thereon approximately 1° C. per hour until room temperature is reached,
    (h) then cooling said ferrite slab with the semiconductor film formed thereon approximately 1° C. per hour within the enclosure until room temperature is reached.

2. The fabrication of semiconductor films for Hall effect generators comprising:
    (a) cutting a slab of high permeability ferrite and grinding and polishing a surface area thereof into an optically flat plate, then scrupulously cleaning said surface,
    (b) placing a scrupulously clean grain of N-type indium antimonide having charge carrier density of $10^{17}$ electrons/cm.$^3$ on the optically flat surface of said ferrite slab,
    (c) placing said ferrite slab with said grain of indium antimonide thereon within an enclosure having an atmosphere of helium therein,
    (d) raising the temperature of said ferrite slab to 550° C. to liquify said grain of indium antimonide, and maintaining an ambient temperature within said enclosure at approximately 250° C.
    (e) squashing said liquified grain of indium antimonide into a flat film on said flat ferrite surface by dropping thereon an optically flat quartz plate which is at said ambient temperature to prevent said film from adhering to the quartz plate, controlling the thickness of said film by the weight of the quartz plate,
    (f) lifting the quartz plate from said indium antimonide film and ferrite slab when the temperature of said slab drops to said ambient temperature within the enclosure,
    (g) them cooling said ferrite slab with the indium antimonide film formed thereon approximately 1° C. per hour within the enclosure until room temperature is reached.

3. The fabrication of semiconductor films comprising:
    (a) cutting a slab of high permeability ferrite and grinding and polishing a surface area thereof into an optically flat plate, (b) placing a boule of semiconductor material on the optically flat surface of said ferrite slab, (c) placing said ferrite slab with said boule of semiconductor material thereon within an enclosure having an inert atmosphere therein, (d) raising the temperature of said ferrite slab to a temperature in the range of from 350° C. to 1000° C. sufficient to liquify said semiconductor boule, and maintaining within said enclosure an ambient temperature of approximately one-half the temperature required to liquify said semiconductor boule, (e) squashing said liquified boule of semiconductor into a flat film on said flat ferrite surface by dropping thereon an optically flat quartz plate which is at the ambient temperature to prevent said film from adhering to the quartz plate, controlling the thickness of said film by the weight of the quartz plate, (f) allowing said ferrite slab to cool, (g) lifting the quartz plate from said semiconductor film and ferrite slab when the temperature of said slab drops to the ambient temperature within the enclosure, (h) then cooling said ferrite slab with the semiconductor film formed thereon approximately 1° C. per hour within the enclosure until room temperature is reached.

4. The method set forth in claim 3 wherein said optically flat ferrite slab and said semiconductor boule are each vapor cleaned in carbon tetrachloride, washed with deionized water and dried in a vacuum prior to placing within said enclosure.

5. Apparatus for fabricating semiconductor films for Hall effect generators and the like comprising:

(a) a hermetically sealable enclosure for containing an inert atmosphere, (b) a substrate heater for heating ferrite plates and the like upon which a boule of semiconductor materials is placed to a temperature for liquifying said semiconductor boule, and a first thermocouple means for monitoring the temperature of said substrate heater, (c) an optically flat quartz plate on the end of a ball joint connector rod held in parallel position above the boule of semiconductor material by a solenoid means, (d) a space heater for maintaining a controlled desired ambient temperature within said enclosure, and a second thermocouple means for monitoring said ambient temperature, (e) means in connection with said first thermocouple means for actuating said solenoid when said boule has reached sufficient temperature to become liquified to drop said quartz plate on said semiconductor boule for squashing said semiconductor boule into a flat film the thickness of which depends upon the weight of said quartz plate, (f) means for shutting off said substrate heater after the quartz plate is dropped and the semiconductor is squashed into a thin film thus allowing the ferrite slab and semiconductor to cool, (g) means in connection with said first and second thermocouple means for actuating said solenoid to raise said quartz plate from the semiconductor film when the temperature of the semiconductor film drops to the ambient temperature thereby preventing sticking of the film to the quartz plate, (h) means allowing the temperature within the enclosure to drop approximately 1° C. per hour, after the quartz plate is lifted, until room temperature is reached.

References Cited in the file of this patent
UNITED STATES PATENTS

| | | |
|---|---|---|
| 2,749,596 | Breckenridge | June 12, 1956 |
| 3,026,427 | Chisholm | Mar. 20, 1962 |
| 3,027,468 | Hill et al. | Mar. 27, 1962 |
| 3,038,241 | Minden | June 12, 1962 |
| 3,043,722 | Houben et al. | July 10, 1962 |

OTHER REFERENCES

Bate et al.: "Journal of Applied Physics," vol. 31, No. 6, June 1960, pp. 991–994.